US009759107B2

(12) United States Patent
Uchiyama et al.

(10) Patent No.: US 9,759,107 B2
(45) Date of Patent: Sep. 12, 2017

(54) EXHAUST PURIFICATION DEVICE FOR INTERNAL COMBUSTION ENGINE

(71) Applicant: ISUZU MOTORS LIMITED, Tokyo (JP)

(72) Inventors: Tadashi Uchiyama, Kamakura (JP); Mitsuhiro Aso, Yokohama (JP); Masafumi Noda, Kawasaki (JP)

(73) Assignee: ISUZU MOTORS LIMITED, Tokyo (JP)

( * ) Notice: Subject to any disclaimer, the term of this patent is extended or adjusted under 35 U.S.C. 154(b) by 124 days.

(21) Appl. No.: 14/768,799

(22) PCT Filed: Feb. 18, 2014

(86) PCT No.: PCT/JP2014/053738
§ 371 (c)(1),
(2) Date: Oct. 20, 2015

(87) PCT Pub. No.: WO2014/132839
PCT Pub. Date: Sep. 4, 2014

(65) Prior Publication Data
US 2016/0040572 A1     Feb. 11, 2016

(30) Foreign Application Priority Data

Feb. 28, 2013   (JP) ................... 2013-039064

(51) Int. Cl.
*F01N 3/025*     (2006.01)
*F01N 3/20*      (2006.01)
(Continued)

(52) U.S. Cl.
CPC ........... *F01N 3/0253* (2013.01); *F01N 3/035* (2013.01); *F01N 3/2066* (2013.01); *F01N 9/002* (2013.01);
(Continued)

(58) Field of Classification Search
CPC ...... F01N 13/009; F01N 3/0253; F01N 3/035; F01N 3/2066; F01N 9/002;
(Continued)

(56) References Cited

U.S. PATENT DOCUMENTS

| 8,578,756 B2 * | 11/2013 | Suzuki | G01K 7/16 73/23.31 |
| 2009/0056310 A1 * | 3/2009 | Xu | F01N 3/035 60/274 |
| 2013/0101471 A1 * | 4/2013 | Yacoub | F01N 3/103 422/168 |

FOREIGN PATENT DOCUMENTS

| JP | 2009-243316 | 10/2009 |
| JP | 2013-2283 | 1/2013 |

OTHER PUBLICATIONS

PCT International Preliminary Report on Patentability dated Sep. 1, 2015 in corresponding International Patent Application No. PCT/JP2014/053738.
(Continued)

*Primary Examiner* — Brandon Lee
(74) *Attorney, Agent, or Firm* — Staas & Halsey LLP

(57) ABSTRACT

An exhaust gas purification device includes a diesel particulate filter (DPF) for capturing particulate matter (PM) in an exhaust gas, a selective catalytic reduction (SCR) device for reducing NOx in the exhaust gas, detecting units for detecting the DPF electrostatic capacity, an estimating unit for estimating the inside temperature of the DPF based on the electrostatic capacity, and a controlling unit for executing forced DPF regeneration. A lower limit temperature is defined as a temperature to trigger PM combustion, and an upper limit temperature is defined as a temperature to avoid filter erosion. The controlling unit executes the forced regeneration with an amount of fuel supplied for causing the inside temperature to reach the lower limit temperature,
(Continued)

when the inside temperature is at or above the SCR activation temperature, and executes the forced regeneration with another amount of fuel supplied for causing the inside temperature to reach the upper limit temperature, when the inside temperature is below the SCR activation temperature.

9 Claims, 4 Drawing Sheets

(51) Int. Cl.
  *F01N 9/00* (2006.01)
  *F01N 3/035* (2006.01)
  *F01N 13/00* (2010.01)

(52) U.S. Cl.
  CPC ........ *F01N 13/009* (2014.06); *F01N 2240/04* (2013.01); *F01N 2560/12* (2013.01); *F01N 2570/14* (2013.01); *F01N 2610/02* (2013.01); *F01N 2610/03* (2013.01); *F01N 2900/0601* (2013.01); *F01N 2900/1602* (2013.01); *F01N 2900/1626* (2013.01); *G01K 2205/04* (2013.01); *Y02T 10/24* (2013.01); *Y02T 10/47* (2013.01)

(58) Field of Classification Search
  CPC ............. F01N 2240/04; F01N 2560/12; F01N 2570/14; F01N 2610/02; F01N 2610/03; F01N 2900/0601; F01N 2900/1602; F01N 2900/1626; G01K 2205/04; Y02T 10/24; Y02T 10/47
  See application file for complete search history.

(56) References Cited

OTHER PUBLICATIONS

Extended European Search Report dated Oct. 13, 2016 in corresponding European Patent Application No. 14756582.4.
Japan Platform for Patent Information, English Abstract of Japanese Publication No. 2009-243316 published Oct. 22, 2009.
Japan Platform for Patent Information, Englsih Abstract of Japanese Publication No. 2013-2283 published Jan. 7, 2013.
International Search Report mailed May 13, 2014 in corresponding International Application No. PCT/JP2014/053738.

\* cited by examiner

EXHAUST PURIFICATION DEVICE FOR INTERNAL COMBUSTION ENGINE

CROSS-REFERENCE TO RELATED APPLICATIONS

This application is a U.S. National Stage Application, which claims the benefit under 35 U.S.C. §371 of PCT International Patent Application No. PCT/JP2014/053738, filed Feb. 18, 2014, which claims the foreign priority benefit under 35 U.S.C. §119 of Japanese Patent Application No. 2013-039064, filed Feb. 28, 2013, the contents of which are incorporated herein by reference.

TECHNICAL FIELD

The present invention relates to an exhaust gas purification device of an internal combustion engine.

BACKGROUND ART

A diesel particulate filter (hereinafter referred to as "DPF"), for example, is known as a filter for collecting particulate matter (hereinafter referred to as "PM") in an exhaust gas emitted from a diesel engine.

The DPF has a limitation on an amount of collecting PM. Thus, it is necessary to carry out forced regeneration that periodically burns and removes the accumulated PM. The forced regeneration is performed by supplying unburned fuel, primarily hydrocarbon (HC), to an oxidation catalyst in an upstream exhaust passage through in-pipe injection or post injection, and raising the exhaust gas temperature to PM burning temperature with the heat generated upon oxidation.

Also, a selective catalytic reduction (hereinafter referred to as "SCR") catalyst is known as a nitrogen compound (hereinafter referred to as "NOx") catalyst for purifying NOx in an exhaust gas. The SCR catalyst selectively reduces and purifies NOx in the exhaust gas by using ammonia ($NH_3$) produced from a urea solution (urea water) upon hydrolysis with heat of the exhaust gas.

LISTING OF REFERENCES

PATENT LITERATURE 1: Japanese Patent Application Laid-Open Publication (Kokai) No. 2013-2283
PATENT LITERATURE 2: Japanese Patent Application Laid-Open Publication (Kokai) No. 2009-243316

SUMMARY OF THE INVENTION

The NOx purification capability or performance of the SCR varies with the catalyst temperature (temperature of the exhaust gas flowing into the SCR). In particular, when the temperature is low (when the SCR temperature is below its activation temperature), the absorption of ammonia ($NH_3$) which serves as the reducing agent decreases. This can be a cause of deteriorating the NOx purification rate. Because of this, if the NOx purification capability of the SCR should be improved, it is necessary to raise the temperature of the exhaust gas flowing into the SCR to the activation temperature at an early stage (or quickly).

The present invention has been developed in such a viewpoint, and an object of the present invention is to effectively improve the NOx purification rate by raising the temperature of the exhaust gas flowing into the SCR to the activation temperature at an early stage.

To achieve the above-mentioned object, an exhaust gas purification device of an internal combustion engine according to the present invention includes a filter that is provided in an exhaust passage of the internal combustion engine and configured to collect particulate matter in an exhaust gas; a urea water spraying unit that is provided in the exhaust passage downstream of the filter and configured to spray urea water into the exhaust gas; a selective reduction catalyst that is provided in the exhaust passage downstream of the urea water spraying unit and configured to reduce and purify a nitrogen compound in the exhaust gas by using ammonia produced from the urea water; an electrostatic capacity detecting unit configured to detect an electrostatic capacity (capacitance) of the filter; a filter temperature estimating unit configured to estimate inside temperature of the filter based on the detected electrostatic capacity; and a filter regenerating unit configured to carry out forced regeneration by supplying fuel to the filter and raising temperature of the filter to or over burning temperature of the particulate matter. The filter regenerating unit is configured to carry out the forced regeneration with an amount of fuel that is supplied to make the inside temperature equal to a predetermined target lower limit temperature, if the calculated inside temperature is equal to or higher than activation temperature of the selective reduction catalyst. The target lower limit temperature is temperature to start burning of the particulate matter. The filter regenerating unit is configured to carry out the forced regeneration with another amount of fuel that is supplied to make the inside temperature equal to a predetermined target upper limit temperature, if the calculated inside temperature is lower than the activation temperature of the selective reduction catalyst. The target upper limit temperature is temperature to avoid erosion of the filter.

The electrostatic capacity detecting unit may include a pair of electrodes disposed in a corresponding pair of cells that oppose each other with at least one cell in the filter interposed therebetween.

The exhaust gas purification device may further include a bypass passage that branches off from the exhaust passage at a position upstream of the filter so as to bypass the filter, and a second filter that is provided in the bypass passage and configured to collect particulate matter in the exhaust gas flowing through the bypass passage. The paired electrodes may be disposed in a corresponding pair of cells that oppose each other with at least one cell in the second filter interposed therebetween.

When the forced regeneration is carried out in the second filter, the paired electrodes may function as a heater.

The exhaust gas purification device of an internal combustion engine according to the present invention can raise the temperature of the exhaust gas flowing into the SCR to the activation temperature at an early stage, and effectively improve the NOx purification rate.

DETAILED DESCRIPTION

Figure 1:
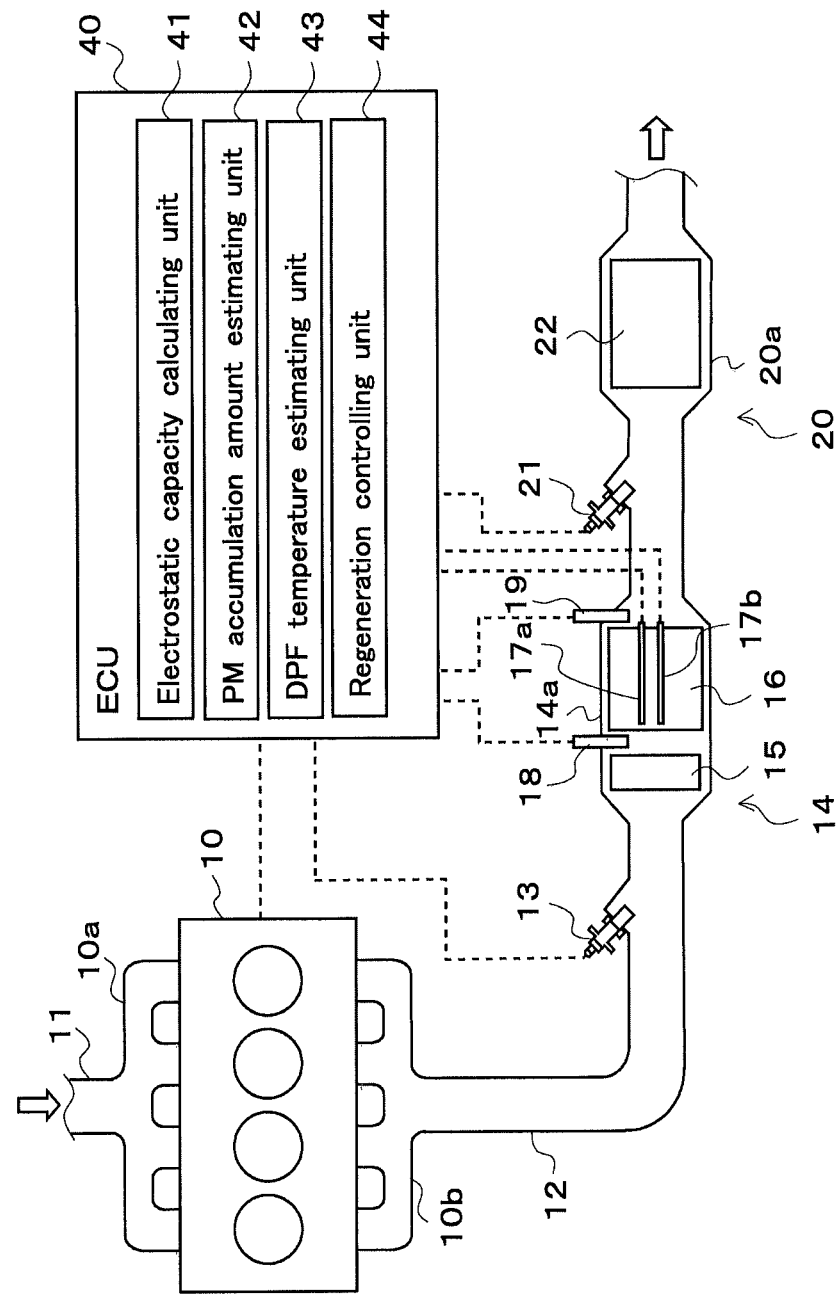
FIG. 1 is an overall configuration diagram schematically illustrating an exhaust gas purification device of an internal combustion engine according to an embodiment of the present invention.

Hereinafter, with reference to FIGS. 1 to 3, an exhaust gas purification device of an internal combustion engine according to embodiments of the present invention will be described. Identical parts are given identical reference numerals and symbols, and their names and functions are identical as well. Therefore, detailed description of such parts will not be repeated.

Figure 2:
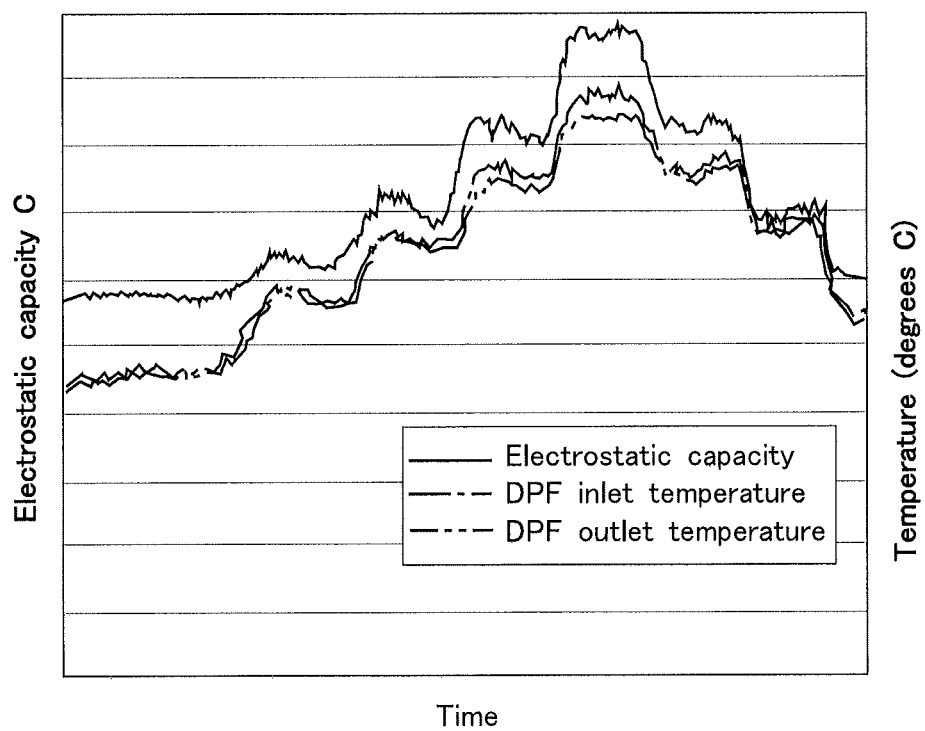
FIG. 2 illustrates a diagram useful to describe changes in the electrostatic capacity, the DPF inlet temperature, and the DPF outlet temperature of the exhaust gas purification device of the internal combustion engine according to the embodiment of the present invention.

As illustrated in FIG. 1, a diesel engine (hereinafter, simply referred to as "engine") 10 has an intake manifold 10a and an exhaust manifold 10b. An intake passage 11 for introducing fresh air is connected to the intake manifold 10a, and an exhaust passage 12 for discharging an exhaust gas to the atmosphere is connected to the exhaust manifold 10b. A pre-stage (upstream) post-treatment device 14 and a post-stage (downstream) post-treatment device 20 are provided in the exhaust passage 12. The post-treatment device 14 is arranged upstream of the post-treatment device 20. It should be noted that the engine 10 is not limited to a diesel engine. The engine 10 can be other internal combustion engines including a gasoline engine.

The pre-stage post-treatment device 14 is constituted by a diesel oxidation catalyst (hereinafter referred to as "DOC") 15 and a DPF 16 disposed in a casing 14a. The DOC 15 is arranged upstream of the DPF 16. An in-pipe injection device 13 is provided upstream of the DOC 15. A DPF inlet temperature sensor 18 is provided upstream of the DPF 16. A DPF outlet temperature sensor 19 is provided downstream of the DPF 16.

The in-pipe injection device 13 injects unburned fuel (primarily HC) into the exhaust passage 12, in response to an instruction signal from an electronic control unit (hereinafter referred to as "ECU") 40. The in-pipe injection device 13 may be omitted if post-injection through multiple-injection of the engine 10 is carried out.

The DOC 15 includes, for example, a ceramic carrier having a cordierite honeycomb structure, with a catalyst component supported on a surface of the ceramic carrier. Upon unburned fuel (primarily HC) being supplied by the in-pipe injection device 13 or through post-injection, the DOC 15 oxidizes the unburned fuel, thereby causing the exhaust gas temperature to rise. The DOC 15 also oxidizes NO in the exhaust gas to produce $NO_2$, thereby causing the ratio of $NO_2$ to NO in the exhaust gas to increase.

The DPF 16 includes, for example, a number of cells defined by porous partition walls disposed along a flowing direction of the exhaust gas. The cells are plugged alternatingly at the upstream side and the downstream side. The DPF 16 collects PM in the exhaust gas into the small cavities and on the surfaces of the partition walls. Upon the amount of accumulated PM reaching a predetermined amount, a so-called forced regeneration for burning and removing the PM is performed. The forced regeneration is performed by supplying unburned fuel (primarily HC) to the DOC 15 by the in-pipe injection device 13 or through post-injection and by raising the temperature of the DPF 16 to the PM-burning temperature (e.g., approximately 600 degrees C.).

The DPF 16 of this embodiment is provided with a pair of electrodes 17a and 17b disposed inside a corresponding pair of cells that oppose each other with at least one cell interposed therebetween. The paired electrodes 17a and 17b form a capacitor. The paired electrodes 17a and 17b are electrically connected to the ECU 40.

The DPF inlet temperature sensor 18 detects the temperature of the exhaust gas flowing into the DPF 16 (hereinafter referred to as "inlet temperature $T_{IN}$"). The DPF outlet temperature sensor 19 detects the temperature of the exhaust gas flowing out of the DPF 16 (hereinafter referred to as "outlet temperature $T_{OUT}$"). The inlet temperature $T_{IN}$ and the outlet temperature $T_{OUT}$ are introduced to the ECU 40 that is electrically connected to the DPF inlet temperature sensor 18 and the DPF outlet temperature sensor 19.

The post-stage post-treatment device 20 includes a urea water spraying device 21 and an SCR 22 disposed in a casing 20a. The urea water spraying device 21 is arranged upstream of the SCR 22.

The urea water spraying device 21 sprays or injects urea water (urea solution) from a urea water tank (not illustrated) into the exhaust passage 12 between the pre-stage post-treatment device 14 and the post-stage post-treatment device 20, in response to an instruction signal from the ECU 40. The sprayed urea water undergoes hydrolysis with the heat of the exhaust gas, and ammonia ($NH_3$) is produced. Ammonia ($NH_3$) is then supplied to the SCR 22 on the downstream side as a reducing agent.

The SCR 22 includes, for example, a ceramic carrier having a honeycomb structure, with a copper zeolite or an iron zeolite supported on a surface of the ceramic carrier. The SCR 22 adsorbs ammonia ($NH_3$) supplied as the reducing agent and reduces and purifies NOx in the exhaust gas passing therethrough with the adsorbed ammonia ($NH_3$).

The ECU 40 controls the engine 10, the in-pipe injection device 13, the urea water spraying device 21, and other components, and includes known CPU, ROM, RAM, input port, output port, and so on. The ECU 40 further includes, as part of its functional elements, an electrostatic capacity calculating unit 41, a PM accumulation amount estimating unit 42, a DPF temperature estimating unit 43, and a regeneration controlling unit 44. The description continues with a premise that these functional elements are included in the ECU 40, which is an integrated piece of hardware, but some of these functional elements can be provided in a separate piece of hardware. In this embodiment, the electrostatic capacity calculating unit 41 and the electrodes 17a and 17b constitute an electrostatic capacity detecting unit according to the present invention.

The electrostatic capacity calculating unit 41 calculates an electrostatic capacity (capacitance) C between the electrodes 17a and 17b on the basis of signals entered from the paired electrodes 17a and 17b. The electrostatic capacity C is calculated by Expression 1, where c represents a dielectric constant of a medium between the electrodes 17a and 17b, S represents the area of the electrodes 17a and 17b, and d represents the distance between the electrodes 17a and 17b.

$$C = \varepsilon \times \frac{S}{d} \qquad \text{Expression 1}$$

The PM accumulation amount estimating unit 42 estimates the amount of accumulated PM collected by the DPF 16 (i.e., $PM_{DEP}$), on the basis of the electrostatic capacity C calculated by the electrostatic capacity calculating unit 41 and an average $T_{AVE}$ of the inlet temperature $T_{IN}$ detected by the DPF inlet temperature sensor 18 and the outlet temperature $T_{OUT}$ detected by the DPF outlet temperature sensor 19. The amount of accumulated PM ($PM_{DEP}$) can be estimated by using an approximation formula, a map, or the like, which may be prepared or obtained in advance through an experiment.

The DPF temperature estimating unit 43 estimates the inside temperature of the DPF 16 (hereinafter, referred to as "DPF inside temperature $T_{DPF}$"). As shown in FIG. 2, the changes in the electrostatic capacity C show a similar response to the detection values of the DPF inlet temperature sensor 18 and the detection values of the DPF outlet temperature sensor 19. In addition, the changes in the electrostatic capacity C show a faster response than the detection values of the DPF inlet temperature sensor 18 and the detection values of the DPF outlet temperature sensor 19. The DPF temperature estimating unit 43 of this embodiment estimates the DPF inside temperature $T_{DPF}$ on the basis of the electrostatic capacity C calculated by the electrostatic capacity calculating unit 41 and the PM accumulation amount $PM_{DEP}$ estimated by the PM accumulation amount estimating unit 42.

More specifically, although the PM accumulation amount varies with the running condition, variations are limited in a certain short time (e.g., approximately one second). In this embodiment, the PM accumulation amount $PM_{DEP}$, which is estimated immediately before the current estimation, is taken as a fixed value. Then, sudden or unexpected changes in the DPF inside temperature $T_{DPF}$, which cannot be followed by the DPF inlet temperature sensor 18 and the DPF outlet temperature sensor 19, are estimated from instantaneous changes (very fast changes) in the electrostatic capacity C. The estimation of the DPF inside temperature $T_{DPF}$ may be performed with approximation formula, a map, or the like, which may be prepared or obtained in advance through an experiment.

The regeneration controlling unit 44 causes the in-pipe injection device 13 to inject fuel (or to perform the post injection), thereby carrying out the forced regeneration, when the PM accumulation amount $PM_{DEP}$ estimated by the PM accumulation amount estimating unit 42 reaches the accumulation upper limit $PM_{MAX}$ that indicates the maximum collectable amount of the DPF 16. An amount of fuel injected during the forced regeneration is feedback controlled in accordance with the DPF inside temperature $T_{DPF}$ (i.e., temperature of the exhaust gas flowing into the SCR 22) estimated by the DPF temperature estimating unit 43.

More specifically, the ECU 40 stores in advance a target lower limit temperature $T_1$ (e.g., 600 degrees C.) at which the PM accumulated in the DPF 16 starts burning, and a target upper limit temperature $T_2$ (e.g., 900 degrees C.) which can avoid erosion of the DPF 16 due to excessively elevated temperature of the DPF 16.

When the DPF inside temperature $T_{DPF}$ is at or above the activation temperature $T_{ACT}$ of the SCR 22 ($T_{DPF} \geq T_{ACT}$), the regeneration controlling unit 44 feedback controls the amount of fuel to be injected such that the DPF inside temperature $T_{DPF}$ during the forced regeneration becomes the target lower limit temperature $T_1$ (lower limit temperature of PM combustion). This effectively suppresses the excessive temperature increase of the SCR 22 during the forced regeneration, and prevents the deterioration of the NOx purification capability.

On the other hand, when the DPF inside temperature $T_{DPF}$ is lower than the activation temperature $T_{ACT}$ of the SCR 22 ($T_{DPF} < T_{ACT}$), the regeneration controlling unit 44 feedback controls the amount of fuel to be injected such that the DPF inside temperature $T_{DPF}$ during the forced regeneration becomes the target upper limit temperature $T_2$ (upper limit temperature of erosion). This raises the temperature of the gas fed to the low temperature SCR 22 to the activation temperature $T_{ACT}$ at an early stage (quickly), and improves the NOx purification capability.

Figure 3:
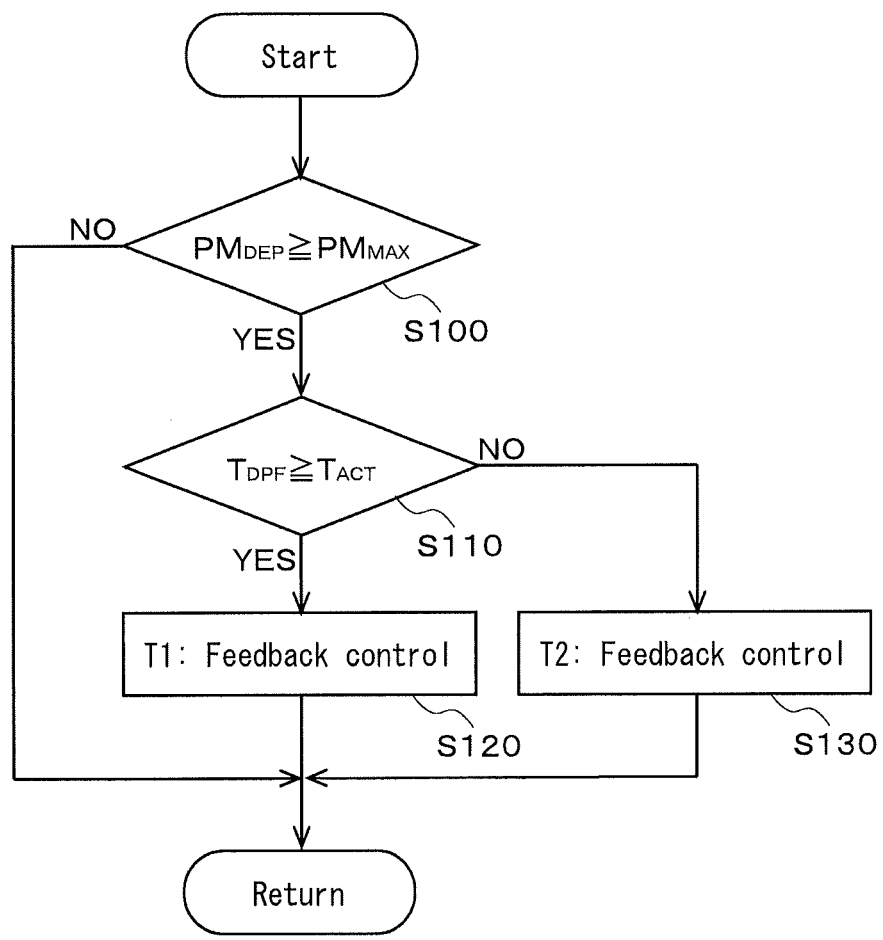
FIG. 3 is a flowchart showing processing to be executed by the exhaust gas purification device of the internal combustion engine according to the embodiment of the present invention.

Referring now to FIG. 3, the control (processing) executed by the exhaust gas purification device of this embodiment will be described. The control starts upon turning on of an ignition key.

At Step (hereinafter, abbreviated as "S") 100, it is determined whether or not the PM accumulation amount $PM_{DEP}$ estimated from the electrostatic capacity C has reaches the accumulation upper limit $PM_{MAX}$. If the PM accumulation amount $PM_{DEP}$ is equal to or greater than the accumulation upper limit $PM_{MAX}$ (YES), the control proceeds to S110. On the other hand, when the PM accumulation amount $PM_{DEP}$ is less than the accumulation upper limit $PM_{MAX}$ (NO), the control proceeds to Return.

At S110, it is determined whether or not the DPF inside temperature $T_{DPF}$ estimated from the electrostatic capacity C and the PM accumulation amount $PM_{DEP}$ has reached the activation temperature $T_{ACT}$ of the SCR 22. When the DPF inside temperature $T_{DPF}$ is equal to or higher than the activation temperature $T_{ACT}$ (YES), the control proceeds to S120. At S120, the amount of fuel to be injected during the forced regeneration is feedback controlled such that the DPF inside temperature $T_{DPF}$ becomes the target lower limit temperature $T_1$ (lower limit temperature of PM combustion). Then, the control proceeds to Return.

On the other hand, when S110 determines that the DPF inside temperature $T_{DPF}$ is lower than the activation temperature $T_{ACT}$ (NO), the control proceeds to S130. At S130, the amount of fuel to be injected during the forced regeneration is feedback controlled such that the DPF inside temperature $T_{DPF}$ becomes the target upper limit temperature $T_2$ (upper limit temperature of erosion). Then, the control proceeds to Return.

Operations and advantages of the exhaust gas purification device of an internal combustion engine according to this embodiment will now be described.

In general, the NOx purification capability of the SCR 22 drops in particular when the temperature of the SCR 22 is low (when the temperature of the SCR 22 is below the activation temperature). Because of this, if the NOx purification capability of the SCR 22 should be improved, it is necessary to raise the temperature of the exhaust gas flowing into the SCR 22 to the activation temperature at an early stage (quickly).

In the exhaust gas purification device of the internal combustion engine according to this embodiment, the DPF inside temperature is precisely estimated from the change in the electrostatic capacity C that has faster response than the exhaust gas temperature sensor, and an amount of fuel to be injected during the forced regeneration is controlled on the basis of the DPF inside temperature. In particular, when the DPF inside temperature has reached the activation temperature of the SCR 22, an amount of fuel to be injected is feedback controlled such that the DPF inside temperature becomes the lower limit temperature of the PM burning. On the other hand, when the DPF inside temperature has not reached the activation temperature of the SCR 22, then an amount of fuel to be injected is feedback controlled such that the DPF inside temperature becomes the upper limit temperature of the filter erosion.

Therefore, the exhaust gas purification device of the internal combustion engine according to this embodiment can precisely estimate the inside temperature of the DPF 16 from the electrostatic capacity C, which shows faster response than the exhaust gas temperature sensor. Also, the exhaust gas purification device of this embodiment can utilize the PM combustion heat (heat generated upon burning of the PM) during the forced regeneration to raise the temperature of the low temperature SCR 22 to the activation temperature at an early stage (quickly). As a result, it is possible to effectively improve the NOx purification capability of the SCR 22.

It is to be noted that the present invention is not limited to the above-described embodiment and can be implemented with changes and modifications, as appropriate, within the scope that does not depart from the spirit of the present invention.

Figure 4:
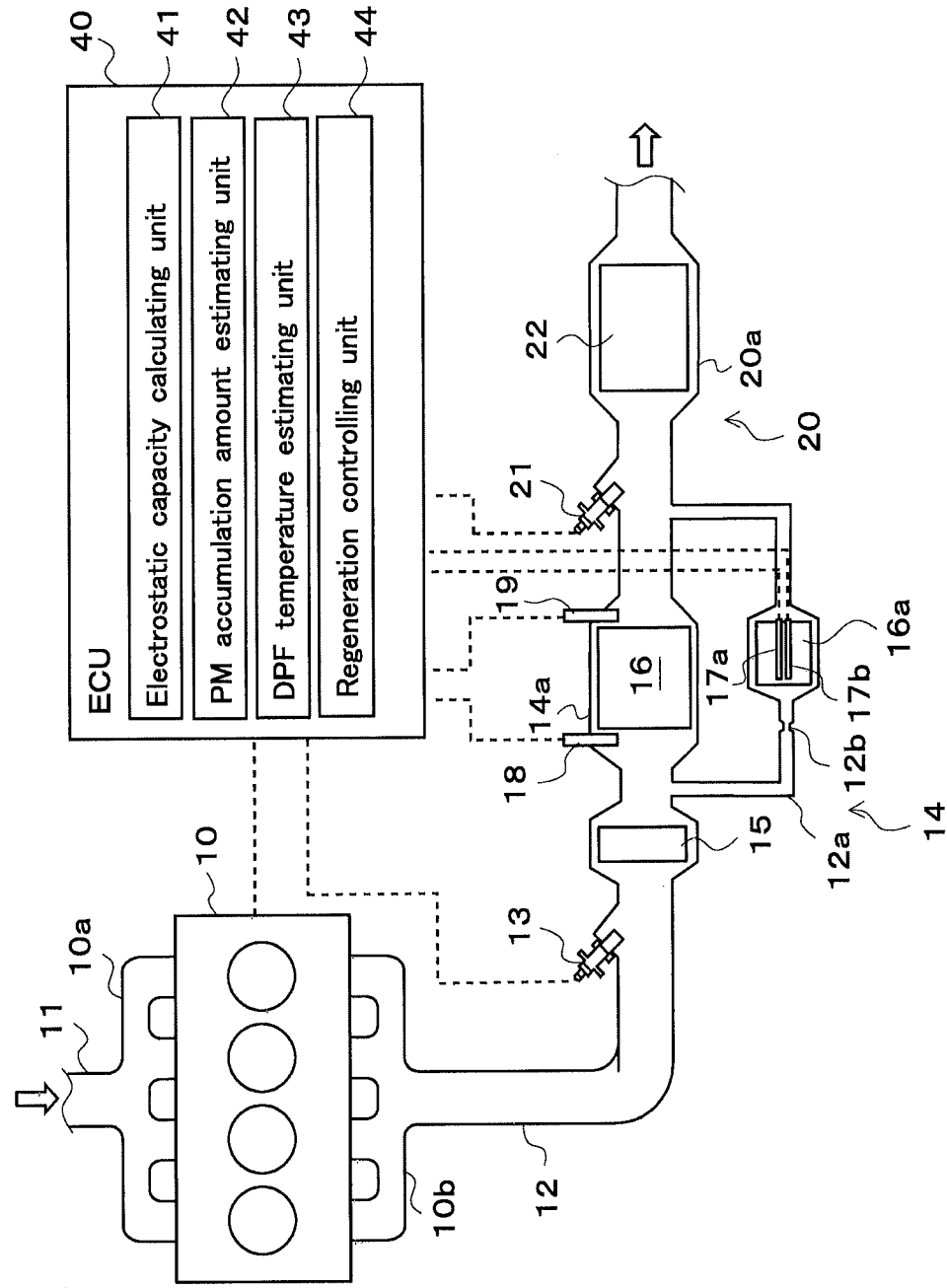
FIG. 4 is an overall configuration diagram schematically illustrating an exhaust gas purification device of an internal combustion engine according to another embodiment of the present invention.

For example, as illustrated in FIG. 4, a bypass passage 12a may be connected to the exhaust passage 12 so as to bypass the DPF 16, and a DPF 16a for measurement (second filter) with a small capacity may be provided in the bypass passage 12a. In this case, it is preferred that a pair of electrodes 17a and 17b be disposed inside a corresponding pair of cells that oppose each other with at least one cell in the DPF 16a interposed therebetween. It is also preferred that the bypass passage 12a be provided with an orifice 12b (throttle) that regulates the flow rate of the exhaust gas. When the forced regeneration of the DPF 16a is executed, the paired electrodes 17a and 17b may be used as a heater by applying a voltage across the electrodes 17a and 17b.

The NOx catalyst is not limited to the SCR 22. The NOx catalyst may be a lean NOx trap (LNT) that absorbs and retains NOx at a lean air-fuel ratio and reduces NOx at a rich air-fuel ratio. This configuration can also achieve the same operation and advantages as the above-described embodiment.

What is claimed is:

1. An exhaust gas purification device of an internal combustion engine, comprising:
   a first filter in an exhaust passage of the internal combustion engine to collect particulate matter in an exhaust gas;
   a urea water injector in the exhaust passage downstream of the first filter and configured to spray urea water into the exhaust gas;
   a selective reduction catalyst in the exhaust passage downstream of the urea water injector to reduce and purify a nitrogen compound in the exhaust gas by using ammonia produced from the urea water; an injector to supply a fuel to the first filter;
   an electronic controller configured to carry out a forced regeneration by supplying the fuel to the first filter and raising a temperature of the first filter to at least a burning temperature of the particulate matter; and
   a pair of electrodes to detect an electrostatic capacity of the first filter;
   wherein the electronic controller is further configured to estimate an inside temperature of the first filter based on the electrostatic capacity detected by the electrodes,
   carry out the forced regeneration with an amount of the fuel that is supplied to make the inside temperature equal to a predetermined target lower limit temperature, when the estimated inside temperature is equal to or higher than an activation temperature of the selective reduction catalyst, the predetermined target lower limit temperature being the burning temperature of the particulate matter; and
   carry out the forced regeneration with another amount of the fuel that is supplied to make the inside temperature equal to a predetermined target upper limit temperature, when the estimated inside temperature is lower than the activation temperature of the selective reduction catalyst, the predetermined target upper limit temperature being a temperature to avoid erosion of the first filter.

2. The exhaust gas purification device of the internal combustion engine according to claim 1, wherein the pair of electrodes is disposed in a corresponding pair of cells in the first filter that oppose each other with at least one cell in the first filter interposed therebetween.

3. The exhaust gas purification device of the internal combustion engine according to claim 1, further comprising:
   a bypass passage that branches off from the exhaust passage at a position upstream of the first filter so as to bypass the first filter; and
   a second filter that is provided in the bypass passage and configured to collect particulate matter in the exhaust gas flowing through the bypass passage,
   wherein an other pair of electrodes are disposed in a corresponding pair of cells of the second filter that oppose each other with at least one cell in the second filter interposed therebetween.

4. The exhaust gas purification device of the internal combustion engine according to claim 3, wherein when forced regeneration of the second filter is carried out, the other pair of electrodes function as a heater.

5. The exhaust gas purification device of the internal combustion engine according to claim 3, wherein a capacity of the second filter is smaller than a capacity of the first filter.

6. The exhaust gas purification device of the internal combustion engine according to claim 3, further comprising an orifice disposed in the bypass passage for adjusting a flow rate of the exhaust gas flowing through the bypass passage.

7. The exhaust gas purification device of the internal combustion engine according to claim 1, wherein the internal combustion engine is a diesel engine.

8. The exhaust gas purification device of the internal combustion engine according to claim 7, wherein the first filter is a diesel particulate filter.

9. The exhaust gas purification device of the internal combustion engine according to claim 3, wherein the second filter is a diesel particulate filter.

* * * * *